April 30, 1963     D. E. COMIRE     3,087,230

INSERTED BIT CLAMPING MEANS

Original Filed Aug. 4, 1958

INVENTOR.
DONALD E. COMIRE
BY *Roberts, Cushman & Grover*
ATT'YS.

United States Patent Office 3,087,230
Patented Apr. 30, 1963

3,087,230
INSERTED BIT CLAMPING MEANS
Donald E. Comire, Brookline, N.H., assignor to The O. K. Tool Company, Inc., Milford, N.H., a corporation of New Hampshire
Continuation of abandoned application Ser. No. 753,065, Aug. 4, 1958. This application Mar. 13, 1961, Ser. No. 95,209
3 Claims. (Cl. 29—96)

This invention relates to cutting tools of various kinds but particularly to machines for milling metal, objects of the invention being to provide a bit clamp which is simple and economical in construction, which can be assembled and dissassembled quickly and easily, and which is durable and reliable in use.

According to this invention the holder, such as a rotating milling head, has a cylindrical recess and, fitting in the recess, is a clamp including two semicyclindrical parts for clamping a bit therebetween, together with a resilient cylindrical shell extending around the parts and an actuator engaging the outer periphery of the shell for causing the parts to grip the bit therebetween. Preferably a spring pin extends through the parts and shell to keep them from falling apart when the clamp is removed from the recess. In the preferred embodiment the shell has a flat face on one side and the actuator comprises a screw threaded into the holder from the same side of the holder as the recess, the screw having a tapered end bearing on the flat face.

More specifically the device comprises a cartridge in the form of a split clamp provided with a slot along a part of its split to receive the bit, the clamp having a bore intersecting the split adjacent the slot, a sleeve enclosing the clamp, the sleeve having a bore matching the clamp bore, a spring pin removably disposed within the matching bores for integrating the sleeve and clamp, and a wedge engaging the holder and sleeve to compress the cartridge and thereby grip the bit.

Figure 1:
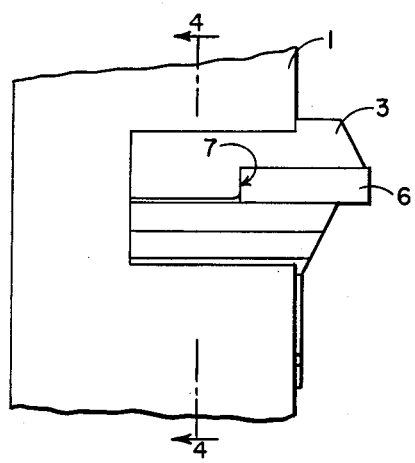
Figure 2:
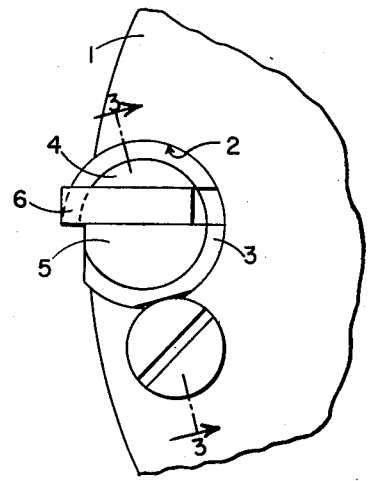
Figure 3:
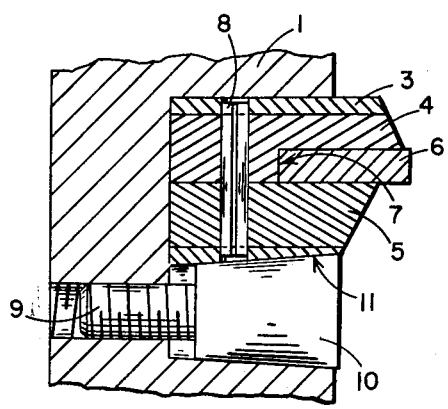
Figure 4:
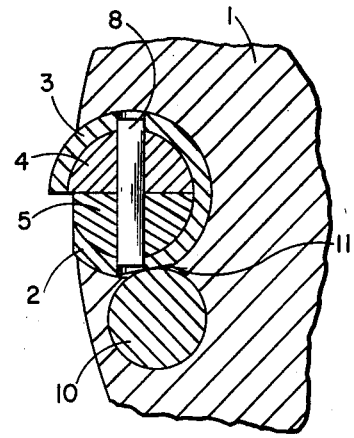

For the purpose of illustration a typical embodiment of the invention is shown in the accompanying drawings in which:

FIG. 1 is a side elevation of a portion of a milling head;
FIG. 2 is an end elevation;
FIG. 3 is a section on line 3—3 of FIG. 2; and
FIG. 4 is a section on line 4—4 of FIG. 1.

The particular embodiment of the invention chosen for the purpose of illustration comprises a rotary holder 1 having a cylindrical recess 2 whose axis is parallel to the axis of the rotating holder 1 and which open through both the end face of the holder and the periphery of the holder. Fitting in the recess is a cylindrical shell 3 and disposed within the shell is a clamp comprising the two semicylindrical parts 4 and 5. The part 4 is recessed to receive the bit 6 with a shoulder 7 against which the bit seats. The parts 3, 4 and 5 are provided with aligned bores to receive a spring pin 8 in the form of a split tube of resilient material. Threaded into the holder 1 at one side of the clamp is a screw 9 having a tapered head 10 engaging against a flat face 11 on one side of the sleeve 3, the flat face being inclined lengthwise of the sleeve at the same angle as the tapered head 10 so that the head seats against the sleeve throughout its entire length.

To remove the bit 6 it is necessary merely to loosen the screw 9 to unclamp the bit. If the bit is of the throwaway type it may be shifted to any one of eight cutting positions and returned to its seat. If it is of the type to be resharpened it may be shifted from right to left (FIG. 2) to compensate for the portion ground off. When the clamp is removed from the holder for any purpose the spring pin 8 yieldingly holds the parts together as a unit.

It should be understood that the present disclosure is for the purpose of illustration only and that this invention includes all modifications and equivalents which fall within the scope of the appended claims.

This application is a continuation of application Ser. No. 753,065 filed August 4, 1958, now abandoned.

I claim:
1. Inserted bit clamping means comprising a holder having a cylindrical recess, a resilient cylindrical sleeve fitting in said recess, a clamp including two semi-cylindrical parts fitting said sleeve, the parts having opposing faces one of which has a bit recess, one end of the bit recess having an outlet at one end of the clamp and the other end of the recess comprising a bit seat facing the outlet, said sleeve being split longitudinally along one side, means to prevent rotation of the clamp relative to the sleeve about the axis of the sleeve, said sleeve having a flat face on one side, and a wedge movably mounted in the holder for engagement with said face for causing said parts to grip the bit therebetween and to prevent rotation of the sleeve relative to the holder about said axis.

2. Inserted bit clamping means according to claim 1 wherein said first means comprises a pin extending through the sleeve and clamp transversely of the plane containing said split and the axis of said sleeve.

3. Inserted bit clamping means according to claim 1 wherein one edge of the split sleeve is recessed to provide bit clearance on one side of the bit recess.

References Cited in the file of this patent
UNITED STATES PATENTS

| 1,287,678 | Hall | Dec. 17, 1918 |
| 2,127,998 | Jearum | Aug. 13, 1938 |
| 2,966,968 | Skeel | Jan. 3, 1961 |

FOREIGN PATENTS

| 87,793 | Switzerland | Feb. 19, 1920 |
| 227,428 | Germany | Oct. 21, 1910 |
| 549,862 | Great Britain | Dec. 10, 1942 |
| 619,549 | Great Britain | Mar. 10, 1949 |
| 814,987 | Germany | Sept. 27, 1951 |